(12) United States Patent
Mirsky et al.

(10) Patent No.: US 7,995,904 B2
(45) Date of Patent: Aug. 9, 2011

(54) TRICK MODE SYSTEM

(75) Inventors: Yair Mirsky, Kfar Adumim (IL); Reuven Wachtfogel, Jerusalem (IL)

(73) Assignee: NDS Limited, Staines, Middlesex (GB)

( * ) Notice: Subject to any disclaimer, the term of this patent is extended or adjusted under 35 U.S.C. 154(b) by 928 days.

(21) Appl. No.: 11/886,989

(22) PCT Filed: Jan. 18, 2006

(86) PCT No.: PCT/IL2006/000071
§ 371 (c)(1),
(2), (4) Date: Nov. 23, 2007

(87) PCT Pub. No.: WO2006/106498
PCT Pub. Date: Oct. 12, 2006

(65) Prior Publication Data
US 2008/0212775 A1      Sep. 4, 2008

Related U.S. Application Data

(60) Provisional application No. 60/669,134, filed on Apr. 7, 2005.

(51) Int. Cl.
*H04N 5/783* (2006.01)
(52) U.S. Cl. .................................. 386/343; 386/345
(58) Field of Classification Search .................. 386/343, 386/345, 346, 347, 348, 350, 354, 356
See application file for complete search history.

(56) References Cited

U.S. PATENT DOCUMENTS

| | | | |
|---|---|---|---|
| 5,282,249 A | 1/1994 | Cohen et al. | |
| 5,377,051 A * | 12/1994 | Lane et al. | 386/314 |
| 5,481,609 A | 1/1996 | Cohen et al. | |
| 6,178,242 B1 | 1/2001 | Tsuria | |
| 6,980,650 B2 | 12/2005 | Wachtfogel et al. | |

(Continued)

FOREIGN PATENT DOCUMENTS

WO      WO 00/01149      1/2000

(Continued)

OTHER PUBLICATIONS

Tzi-cker Chiueh et al., "Design and Implementation of the Stony Brook Video Server" [Computer Science Department, State University of New York at Stony Brook]; (John Wiley & Sons, Ltd., CCC 0038-0644/97/020139-16, 1996, pp. 140-154).

(Continued)

*Primary Examiner* — Robert Chevalier
(74) *Attorney, Agent, or Firm* — Husch Blackwell LLP

(57) ABSTRACT

A method is described for trick mode playback, the method including selecting a key-frame in a recording substantially in the vicinity of a trick mode playback starting position, preparing a decryption key associated with a key period including the selected key-frame, sending the prepared decryption key to a descrambler, thereby enabling decryption of video beginning at the selected key-frame, sending a first number P seconds of decrypted video frames, starting at the selected key-frame, at a predetermined speed for a predetermined number of seconds, to a video decoder, in parallel to the sending P seconds of video frames, choosing at least a second video section to stream to the video decoder, sending a decryption key associated with the chosen second video section to the descrambler, and repeating the steps of selecting, preparing, sending the prepared decryption key, and sending a first number P seconds of decrypted video frames. Related apparatus and methods are also described.

13 Claims, 4 Drawing Sheets

U.S. PATENT DOCUMENTS

| | | |
|---|---|---|
| 2003/0035543 A1 | 2/2003 | Gillon et al. |
| 2004/0165722 A1 | 8/2004 | Van Rijnsoever et al. |

FOREIGN PATENT DOCUMENTS

| | | | |
|---|---|---|---|
| WO | WO 01/25669 A1 | 5/2001 | |
| WO | WO 03/010970 A2 | 2/2003 | |

OTHER PUBLICATIONS

Tzi-cker Chiueh, "Design Issues of Video Storage Servers" [Computer Science Department, State University of New York at Stony Brook] found at http://www.google.com/search?g=cache:xLHTPimhNtkJ:www.ecsl.cs.sunysb.edu/slides.ps+%22Design+Issues+for+Video+Storage+Servers%22&hl=en.

Tzi-cker Chiueh et al., "An Empirical Study of Admission Control Strategies in Video Servers" [Computer Science Department, State University of New York at Stony Brook and Bell Laboratories, Lucent Technology].

H. Schulzrinne et al., "Real Time Streaming Protocol (RTSP)" (The Internet Society, Network Working Group, Request for Comments 2326, Apr. 1998).

Michael Vernick et al., "Adventures in Building the Stony Brook Video Server" [Computer Science Department, State University of New York at Stony Brook]; (ACM Multimedia 96, Boston 1996, pp. 287-295).

Michael Vernick et al., "Performance Evaluation of the Stony Brook Video Server" [Computer Science Department, State University of New York at Stony Brook].

"Digital Video Broadcasting (DVB); DVB SimulCrypt; Part1: Head-end architecture and synchronization" (ETSI Technical Specification TS 101 197-1 VI.1.1, Jun. 1997).

"Digital Video Broadcasting (DVB); Implementation Guidelines of the DVB Simulcrypt Standard" (ETSI Technical Report TR 102 035 VI. 1.1, Apr. 2002).

"Digital Video Broadcasting (DVB); Support for use of scrambling and Conditional Access (CA) within digital broadcasting systems" (ETSI Technical Report ETR 289, Oct. 1996).

* cited by examiner

FIG. 3

| $S_1$ | $J_1$ | $S_2$ | $J_2$ | ... | $J_{n-1}$ | $S_n$ |

FIG. 4

| I | B | B | P | I | ... | B | KEY_PERIOD_−2 |
| B | P | I | B | B | ... | B | KEY_PERIOD_−1 | ← 420
| I | B | B | P | I | ... | B | KEY_PERIOD_0 | ← 400
| B | P | I | B | B | ... | B | KEY_PERIOD_+1 | ← 430
| I | B | B | P | I | ... | B | KEY_PERIOD_+2 | ← 440

TRICK MODE SYSTEM

The present application is a 35 USC §371 application of PCT/IL2006/000071, filed on 18 Jan. 2006 and entitled "Novel Trick Mode System", which was published in the English language with International Publication Number WO 2006/106498, and which claims the benefit of priority from U.S. Provisional Patent Application No. 60/669,134, filed 7 Apr. 2005.

FIELD OF THE INVENTION

The present invention relates to personal video recorders in general, and particularly but not exclusively to trick mode playback for use with personal video recorders.

BACKGROUND OF THE INVENTION

Systems for scrambling a television data stream are well-known in the art. One such system is described in the following U.S. Pat. Nos. 5,282,249 to Cohen et al.; 5,481,609 to Cohen et al. Scrambled television data streams described in the Cohen et al patents comprise both scrambled data representing television signals and coded control messages, also known as ECMs. The ECMs of Cohen et al comprise, in a coded form, data necessary for generating a control word (CW) which may be used to descramble the scrambled data representing television signals.

Data necessary for generating a control word may comprise all or part of an ECM. In the present specification and claims, for sake of simplicity of description, generation of a control word is sometimes described as taking place based on an ECM, it being appreciated that all or part of an ECM may be used. Data necessary for generating a control word is known in the art to take many different forms and may include, in general, at least any of the following: a control word; an encrypted control word packet which is intended to be decrypted before use; and a seed to a generating function such as, for example, a one-way function which generates the control word upon input of the seed. Control words are also termed "keys"; the terms "control word" and "key", in all of their grammatical forms, are used interchangeably throughout the present specification and claims. Throughout the present specification and claims the terms "control word generating information" and "CW generating information" are used interchangeably to designate data necessary for generating a control word in any appropriate form, as described above.

While the two patents to Cohen et al describe an analog system, that is, a system in which analog television data streams are broadcast to television sets, it is appreciated that similar ECM methods may also be used for digital television data streams. Generally, the scrambling techniques used for scrambling analog television signals such as, for example, the well-known "cut-and-rotate" technique, are chosen for their applicability to analog signals. In scrambling of digital television signals other scrambling techniques, well-known in the art, are used, the techniques being more appropriate to digital signals such as, for example, applying the well-known DES algorithm, the well-known triple-DES algorithm, or the DVB Common Scrambling Algorithm to the digital television signals; it is appreciated that any appropriate scrambling technique may be used.

Methods of transmitting a scrambled digital signal, including ECMs, are described in the MPEG-2 standard, ISO/IEC 13818-6, 12 Jul. 1996 and subsequent editions. In general, methods of transmitting a scrambled digital signal, including ECMs, are well known. Some systems use a composite signal, that is, an analog or digital signal including a plurality of components. Typically the plurality of components includes both a scrambled television signal component and an ECM component, the ECM component comprising a plurality of ECMs. Prior art references which discuss examples of this type of signal include the following: DVB ETR289, "Digital Video Broadcasting (DVB): Support for use of scrambling and conditional access (CA) within digital broadcasting systems"; and DVB SIM061, "Technical specification of DVB-Simulcrypt", 1 Apr. 1997.

It is appreciated that references to MPEG-2 are by example only, and any appropriate video coding system may be used. For example and without limiting the generality of the foregoing, MPEG-4, Windows Media 9, and DIVX are all possible video standards in which preferred implementations of the present invention may be practiced.

The system of Cohen et al and other systems described in the art share a feature of broadcasting an ECM synchronous to, generally immediately before or in a data stream parallel to, the actual scrambled broadcast. Typically, the CW or key which can be generated from such an ECM (or from CW generating information comprised therein) is valid for a brief duration known as a "key period". Typically, a key period lasts for a few seconds, such as 8 seconds or 10 seconds. Each key period is associated with a segment of scrambled data or content which can be descrambled using the key associated with that key period. The concept of key period is explained in the above-mentioned DVB ETR289 reference, as well as in Simulcrypt specification ETSI TS 101 197 and Simulcrypt guidelines ETSI TR 102 035.

It is well known in broadcasting to provide many ECMs for each key period so that, for example, if one tunes to a new broadcast program one need not wait for the next key period to begin in order to view the broadcast; rather, one need only wait for the next ECM. Typically, an ECM is broadcast a plurality of times, such as 10 or 20 times, per key period.

When scrambled data is recorded for later descrambling and playback, it is typically only necessary to store one ECM per key period. One example of a system for recording and playing back scrambled data is described in U.S. Pat. No. 6,178,242 to Tsuria, the disclosure of which is hereby incorporated herein by reference.

Another example of a system for recording and playing back scrambled data is described in the following patents and patent applications, the disclosures of which are hereby incorporated herein by reference: PCT Published Patent Application WO 00/01149 of NDS Limited; corresponding European Patent 1 013 088 of NDS Limited; and U.S. patent application Ser. No. 09/515,118 of Wachffogel et al, assigned to NDS Limited. Such a system is one example of a type of system known in the art as a Personal Video Recorder or PVR.

Playing back a scrambled recorded data stream presents certain challenges, some of which have been addressed in the following patents and published patent applications, the disclosures of which are hereby incorporated herein by reference:

1. PCT Published Patent Application WO 01/35669 of NDS Limited; corresponding European Patent 1 142 340 of NDS Limited; and corresponding U.S. patent application Ser. No. 09/574,096 of Darshan et al, assigned to NDS Limited; and 2. PCT Published Patent Application WO 03/010970 of NDS Limited; corresponding European Patent application EP 02745762.1, published in the English language as EP 1417837 and corresponding U.S. patent application Ser. No. 10/479,373 of Darshan et al, assigned to NDS Limited.

3. U.S. patent application Ser. No. 10/760,952, of Wachtfogel, et al., filed 20 Jan. 2004, now U.S. Pat. No. 6,980,650, granted on 27 Dec. 2005. The disclosures of U.S. patent application Ser. No. 10/760,952, and U.S. Pat. No. 6,980,650 are hereby incorporated by reference.

The RTSP protocol, as described on the World Wide Web (WWW) at www.ietf.org/rfc/rfc2326.txt, and in later drafts found at www.rtsp.org/drafts/ describes a protocol by which a server streams video frame data to a client.

The term "render" is used, in all its grammatical forms, throughout the present specification and claims to refer to any appropriate mechanism or method of making content palpable to one or more of the senses. In particular and without limiting the generality of the foregoing, "render" refers not only to display of video content but also to playback of audio content.

The ability of PVRs to render video at speeds other than normal speeds is known in the art as "trick modes". Typically, a PVR executes a trick mode in one of two fashions:

Smooth trick modes—the PVR sends all video frames of the playback in the recorded file to a video decoder. The frames are sent at a higher than normal speed. The video decoder may either:
 (a) Decode all the frames—but drop some of the frames, since a TV set can usually render only 25 or 30 frames per second, and a high definition TV set can usually render 50-60 frames per second, and in a smooth trick mode the number of frames decoded per second is typically higher than the number of frame that can be displayed on the TV set.
 (b) Decode selected frames—Drop B-frames or P-frames as needed to keep up with the speed.
 (c) Combine methods (a) and (b)

Those skilled in the art will appreciate that smooth trick modes incur a performance requirement both on the PVR hard drive and the video decoder. Thus, smooth trick modes are typically used only for low fast-forward and rewind speeds.

Scan trick modes—only selected frames from the playback are sent to the video decoder. Sending only selected frames to the video decoder typically entails:
 (1) selecting a key-frame to be sent to the video decoder and rendering the key-frame;
 (2) pausing a certain period of time;
 (3) jumping in the recording a distance corresponding to the speed at which the user is viewing (for instance, ×30 ("times 30") trick mode will jump a certain distance in the recording, while ×50 ("times 50") trick mode will jump farther in the recording); and
 (4) repeating step 1.

In scan trick modes, typically, there is a noticeable pause between the frames presented, as the frames usually comprise frames from different scenes, and a user's eye needs to adjust to the change of scenes.

Of the two types of trick modes, smooth trick modes are preferred as smooth trick modes have a pleasing visual affect. However, smooth trick modes are only used for low-speed trick modes, since video decoders and/or hard drives cannot perform quickly enough to process all of the frames to be rendered.

The disclosures of all references mentioned above and throughout the present specification, as well as the disclosures of all references mentioned in those references, are hereby incorporated herein by reference.

SUMMARY OF THE INVENTION

The present invention seeks to provide an improved personal video recorder, particularly improving trick mode playback for, but not exclusively, for use with personal videorecorders (PVRs).

The inventors of the present invention believe that a problem may exist when playback of recorded scrambled content, particularly but not exclusively video content, is attempted at high "fast forward" or "fast reverse" speed. Persons skilled in the art will appreciate, in light of the above discussion, that, in normal speed playback, a key for descrambling the scrambled content must be produced for every key period. In fast forward playback, only 1 in every n frames of content must be rendered; however, if n is less than the number of frames in a key period, it is still necessary to produce a key for descrambling the scrambled content for every key period.

When playback is very fast, the necessity of producing keys from ECMs may strain the abilities of the playback system. This is because, in playback of a "live" broadcast stream, only one ECM must be processed to produce a key for each key period; in fast forward playback, by contrast, up to one ECM must be processed for each frame, assuming that care is taken to avoid frames which straddle two key periods. Otherwise, two ECMs may be needed. It will therefore be appreciated that the processing rate for ECMs increases substantially, and a large number of ECMs must be processed per second during fast forward playback.

In preferred embodiments of the present invention, a new trick mode uses concepts from both smooth trick mode and scan trick mode.

The new trick mode renders sections of video content using smooth trick modes methods. After each section is rendered, a jump will be performed and a new section will be rendered.

There is thus provided in accordance with a preferred embodiment of the present invention selecting a key-frame in a recording substantially in the vicinity of a trick mode playback starting position, preparing a decryption key associated with a key period including the selected key-frame, sending the prepared decryption key to a descrambler, thereby enabling decryption of video beginning at the selected key-frame, sending a first number P seconds of decrypted video frames, starting at the selected key-frame, at a predetermined speed for a predetermined number of seconds, to a video decoder, in parallel to the sending P seconds of video frames, choosing at least a second video section to stream to the video decoder, sending a decryption key associated with the chosen second video section to the descrambler, and repeating the steps of selecting, preparing, sending the prepared decryption key, and sending a first number P seconds of decrypted video frames.

Further in accordance with a preferred embodiment of the present invention the choosing includes defining a new starting position based, at least in part, on the following the previous starting position, P, and a second number J seconds of video to be skipped.

Still further in accordance with a preferred embodiment of the present invention the recording is encrypted in accordance with a data stream encryption scheme not using ECM and key polarity, and the vicinity includes three consecutive key periods, the middle of the three consecutive key periods including a candidate key period.

Additionally in accordance with a preferred embodiment of the present invention the recording is encrypted in accordance with a data stream encryption scheme using ECM and key polarity, and the vicinity includes one of if a candidate key period has the same key polarity as previous frames which were streamed, the vicinity includes a key period immediately before the candidate's position, and a key period immediately after the candidate's position, and if the candidate key period has the opposite key polarity as previous frames which were streamed, the vicinity includes the candidate position's key period, a key period two key periods prior to the candidate key period, and a key period two key periods after the candidate key period.

There is also provided in accordance with another preferred embodiment of the present invention a key-frame selector, which selects a key-frame in a recording, the key frame being substantially in the vicinity of a trick mode playback starting position, a decryption key preparer, operative to prepare a decryption key associated with a key period including the selected key-frame, a transmitter which transmits the prepared decryption key to a descrambler, thereby enabling decryption of video beginning at the selected key-frame, a video decryptor which sends a first number P seconds of decrypted video frames, starting at the selected key-frame, at a predetermined speed for a predetermined number of seconds, to a video decoder, a video selector which, in parallel to the video decryptor sending P seconds of video frames, chooses at least a second video section to stream to the video decoder, and a decryption key transmitter which sends a decryption key associated with the chosen second video section to the descrambler, wherein the trick mode playback apparatus is operative to iteratively repeat the selecting the key frame, preparing the decryption key, transmitting the prepared decryption key, and sending a first number P seconds of decrypted video frames.

BRIEF DESCRIPTION OF THE DRAWINGS

The present invention will be understood and appreciated more fully from the following detailed description, taken in conjunction with the drawings in which:

FIG. 3 is a simplified block diagram illustration of sections of video for rendering during trick mode play and sections of video jumped over during trick mode play within the system of FIG. 1;

FIG. 4 is a simplified block diagram illustration depicting a stream of frames and key periods in a video stream within the system of FIG. 1;

DETAILED DESCRIPTION OF A PREFERRED EMBODIMENT

Figure 1:
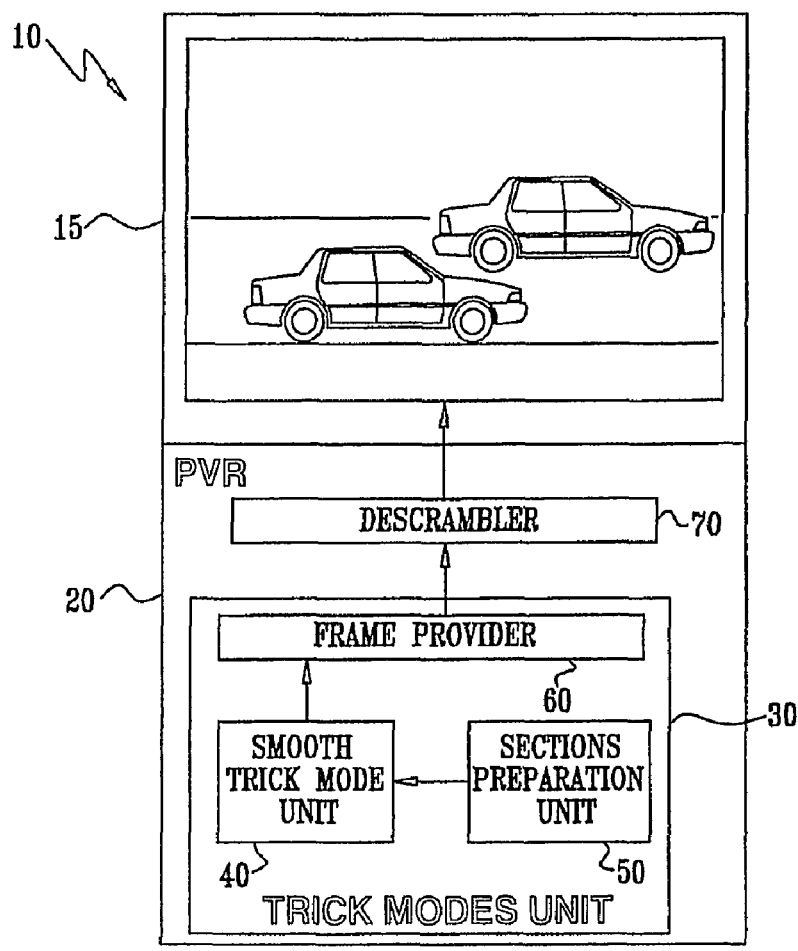
FIG. 1 is a simplified partly pictorial, partly block diagram illustration of a PVR-based television apparatus including a system for providing keys for descrambling content, constructed and operative in accordance with a preferred embodiment of the present invention.

Reference is now made to FIG. 1, which is a simplified partly pictorial, partly block diagram illustration of a PVR-based television apparatus including a system for providing keys for descrambling content, constructed and operative in accordance with a preferred embodiment of the present invention. In the system of FIG. 1, generally designated 10, a television 15 is shown rendering a scene provided for rendering by a personal video recorder (PVR) 20.

The PVR 20 is preferably implemented in any suitable combination of software and hardware, as is well known in the art. The PVR 20 preferably includes suitable conventional components (not shown), as are well known in the art. Non-limiting examples of conventional PVR systems well known in the art include:

the system described in PCT Published Patent Application WO 00/01149 of NDS Limited, corresponding European Patent 1 013 088 of NDS Limited, and U.S. patent application Ser. No. 09/515,118 of Wachtfogel et al, referred to above; and the XTV™ system, commercially available from NDS Limited, One London Road, Staines, Middlesex TW18 4EX, United Kingdom.

In addition to conventional components, the PVR 20 preferably includes a trickmodes unit 30. The trick modes unit 30 preferably includes a smooth trick mode unit 40, a sections preparation unit 50, and a frame provider 60. A descrambler 70 is preferably included in the PVR 20.

The operation of the apparatus of FIG. 1 is now briefly described.

A user (not shown) requests a "trick mode" such as, for example, fast forward or fast reverse rendering of content stored in the PVR 20. For purposes of simplicity of description, fast forward, fast reverse, and other trick modes are sometimes termed herein "fast forward"; persons skilled in the art will appreciate that the invention is not thereby limited.

In an environment such as a home network environment, the request preferably includes a request from a client to a server to play from a given place at a given speed and direction. Any appropriate protocol known in the art may be used for the request; one particular non-limiting example of a suitable protocol is the well-known RTSP protocol, described, for example in documents published on the World Wide Web (WWW) at www.ietf.org/rfc/rfc2326.txt, and in later drafts found at www.rtsp.org/drafts/. In such a client-server network, the server typically streams video frame data to the client, and supplies ECMs as necessary. Persons skilled in the art will appreciate that, in a home network environment, the trick modes unit 30 is typically located in a server remote from the television 15 and that other conventional components (not shown) are provided in order to implement the network.

In a non-server ("local") PVR environment, such as that shown in FIG. 1, speed of fast forward is typically set by an internal call within the PVR, so that a specific protocol need not be used. In preferred embodiments of the present invention, a combination of both smooth trick mode and scan trick mode preferably provide a stream of frames for viewing during fast forward.

In preferred embodiments of the present invention, trick modes preferably render sections of video content using smooth trick modes methods. After each section a segment of video will be jumped over, and a new section will be rendered. As will be explained below in greater detail, the smooth trick mode unit 40 preferably prepares a first section of video including a substantially continuous stream of video frames. The first section of video is preferably delivered by the smooth trick mode unit 40 to the frame provider 60. The frame provider 60 preferably delivers the first section of video to the descrambler 70 for descrambling. The descrambled first section of video is preferably further processed by the PVR and is finally preferably delivered to the television 15 for rendering.

In parallel to preparing and delivering the first section of video, the sections preparation unit 50 preferably selects and prepares a second section of video at some appropriate distance, as described below in more detail, from the first section of video. After the smooth trick mode unit 40 completes the delivery of the first section of video to the frame provider 60, the sections preparation unit 50 delivers the second section of video to the smooth trick mode unit 40 for delivery to the frame provider 60. The method described above is repeated for each section of video to be rendered during fast forward.

Figure 2:
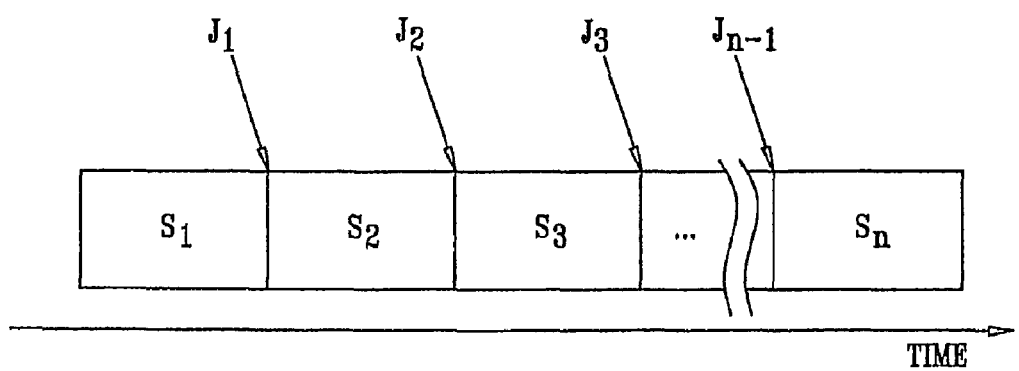
FIG. 2 is a simplified timeline illustration of sections of video and jumps between the sections of video within the system of FIG. 1.

Reference is now made to FIG. 2, which is a simplified timeline illustration of sections of video and jumps between the sections of video within the system of FIG. 1. As explained above, the trick modes unit 30 preferably produces a first video section followed by a jump to a second video section The first video section is depicted in FIG. 2 as $S_1$. $S_1$ is followed by a jump, $J_1$, to the second video section, $S_2$. Those skilled in the art will appreciate that the jump, $J_1$, appears to be instantaneous. The sequence of video section followed by a jump to the next video section repeats until a last jump, $J_{n-1}$ and a last video section, $S_n$.

A preferred method of implementation of the present invention includes:

Let S be a trick mode speed requested by the user, in units of a desired multiple of normal broadcast speed (for example, and without limiting the generality of the foregoing, S=200 for "times 200", or ×200; S=50 for "times 50" or ×50 and so forth). The value of S can range, theoretically, from −infinity (for fast reverse) to infinity (for fast forward).

Let P be a number of seconds of content that preferably will be presented in each video section rendered. Typically, 6>=P>=1. Those skilled in the art will appreciate that in practice, P may be differ for different video segments to be rendered.

Let L be the speed at which the video section to be rendered preferably will be rendered using smooth fast-forward, in units of normal broadcasted speed. Typically, 6>=L>=1, as, in the current state of the art, 6× video speed is generally considered the maximum speed for smooth trick mode. As the state of the art improves, the maximum value of L will accordingly increase. Although L may be equal to 1, the illusion of trick mode fast forward only appears when L is greater than 1. Thus, L is preferably greater than or equal to 2.

Let T=P/L, the number of seconds that it preferably takes to render each video section.

Let J=(T*S)−P, the number of content seconds to jump forward (or backwards in case of reverse, as explained in detail below) after each section to be rendered is rendered. Consider the following example, presented in order to clarify the rationale behind the calculation of J. If the user requests 200× fast forward (S=200), and the section of video to be rendered is 4 seconds in duration (P=4), and the 4 second duration video is to be rendered at 2× speed (L=2) then:

$$J=(T*S)-P=(P/L*S)-P$$

$$J=(4/2*200)-4$$

$$J=(2*200)-4$$

$$J=400-4=396.$$

In other words, a video clip of 400 seconds duration will be segmented into two segments:

a 4 second segment which is preferably rendered; and a 396 second segment which is preferably jumped over. It is appreciated that, in actuality, the precise length of the segment jumped over will also depend on key period considerations, as explained below.

The pattern of a small segment which is preferably rendered and a large segment which is preferably jumped over is illustrated in FIG. 3, which is now additionally referred to. FIG. 3 is a simplified block diagram illustration of sections of video for rendering during trick mode play and sections of video jumped over during trick mode play within the system of FIG. 1. A first short segment for rendering, $S_1$ is followed by a long segment, $J_1$, which is jumped over. $J_1$ is followed by a second short segment for rendering, $S_2$. $S_2$ is followed by a long segment, $J_2$, which is jumped over. The pattern of short segment for rendering ($S_1$, $S_2$, . . . ) followed by a long segment ($J_2$, $J_2$, . . . ) which is jumped over, is repeated until $J_{n-1}$ and $S_n$. Those skilled in the art will appreciate that having a first short video segment played at smooth trick mode speed followed by a jump to a second short video segment played at smooth trick mode speed produces a visual effect which is pleasing to the eye.

Those skilled in the art will appreciate that where fast rewind is requested, S is a negative number, and hence, J=(T*S)+P.

With those values, the preferred method of implementing the present invention includes:

a. selecting a key-frame in a recording substantially in the vicinity (the term "vicinity" is defined below) of the starting position, and preparing a decryption key for the key-frame.

b. sending P seconds of video frames, starting at the selected key-frame, at speed L for T seconds, to an video decoder. The decoder will preferably render the P seconds of video frames using smooth trick mode at speed L. Or, alternatively, if L=1, the decoder will preferably render the P seconds of video frames at normal video speed.

c. in parallel to step b, choosing at least one section to stream by selecting a key-frame substantially in the vicinity of the start position+J+P content seconds in the recording, as described below, and preparing a decryption key for the chosen key-frame. Those skilled in the art will appreciate that where fast rewind is requested, the key-frame is preferably selected substantially in the vicinity of the start position−J−P in the recording.

d. sending the prepared decryption key to the descrambler.

e. jumping J seconds of content forward in the recording.

f. repeating steps b and c in parallel.

The following three examples illustrate how using different parameters all result in 50× fast forward:

1. jump 96 content seconds, show 4 seconds at double speed (i.e. 2 seconds duration);

2. jump 49 content seconds, show 1 second for 1 second; and 3. jump 48 content seconds, show 2 seconds at double speed (i.e. 1 second duration).

Since key periods are typically between 8 and 10 seconds long, in all three cases, only one control word is required to render the video segment, provided that care is taken not to jump to a key period transition point.

Reference is now made to FIG. 4, which is a simplified block diagram illustration depicting a stream of frames and key periods in a video stream within the system of FIG. 1. The video stream of FIG. 4 depicts key-frames alternating with a series of predictive frames. For ease of depiction, only a limited number of predictive frames are depicted. The stream depicted in FIG. 4 is provided for illustrative purposes only, and is not meant to be limiting. In step a and step c above, an key-frame is preferably selected substantially in the vicinity of the starting position in a recording. Preferably, the key-frame selected is substantially close to the beginning of a key period, so that a minimum number of keys are needed to render the video section. For example, key-frame 400 would be selected rather than key-frame 430, as key-frame 400 is at the start of its key period. As explained in greater detail below, the term "vicinity", in all of its grammatical forms, as used in the present specification, is used to refer to a set of up to three key periods, those three key periods selected from a candidate key period (depicted as key_period_0) including at least one key-frame 400; up to two key periods (depicted as key_period_−2, key_period_−1), each key period including at least one key-frame, before the candidate key period_0; and up to two key periods (depicted as key_period_+1, key_period_+2), each key period including at least one key-frame, after the candidate key_period_0. Note that for ease of depiction, key_period_+2 is depicted as truncated.

For each of the up to three key periods under consideration, all key-frames included in the key period, for example, key-frames 420, 400, 430, and 440 are evaluated to determine the number of decryption keys required to play P seconds of video starting with the key-frame under consideration. The key-frame which preferably will be selected will preferably be the key-frame among the considered key-frames requiring the minimum number of decryption keys required to play P seconds of video starting with the particular key-frame under consideration. If several key-frames satisfy the minimum number of decryption keys requirement, the key-frame closest to a target position is preferably selected.

In systems where ECM and key polarity is not a factor, as will be explained below, "vicinity" includes three consecutive key periods, where the candidate key period is in the center of the three key periods. For example, and without limiting the generality of the foregoing, in a system where ECM and key polarity is not a factor, key_period_−1, key_period_0, and key_period_+1, as depicted in FIG. 4, include the "vicinity" of the candidate key period, key period_0.

Figure 5:
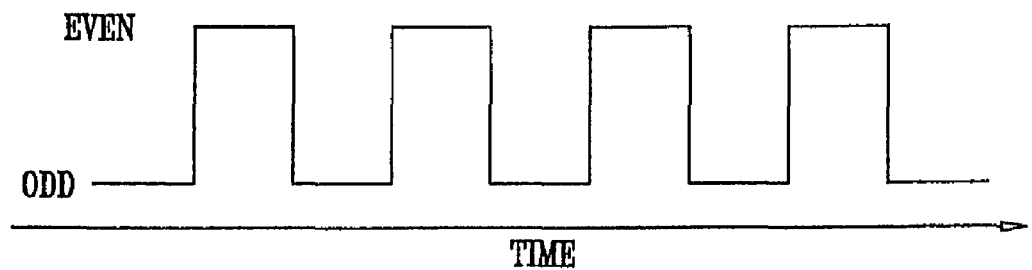
FIG. 5 is a simplified timeline illustration of control word polarity within the system of FIG. 1.
Figure 6:
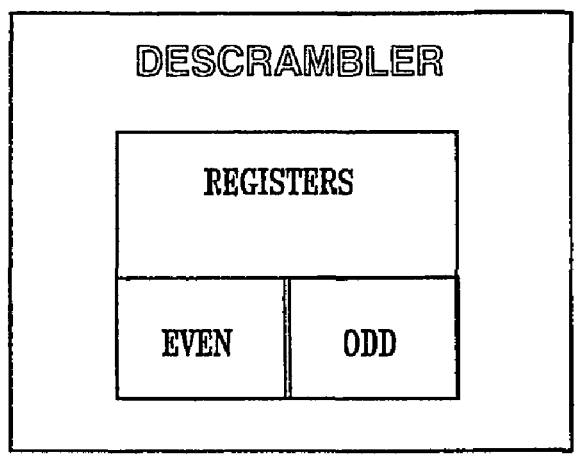
FIG. 6 is a simplified block diagram illustration of a preferred implementation of a descrambler in the PVR of FIG. 1.
Figure 7:
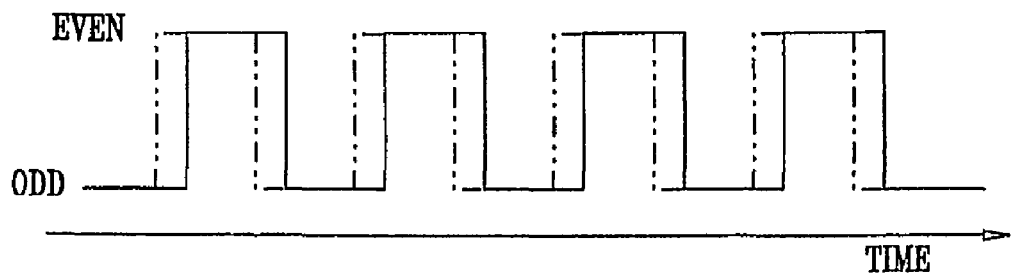
FIG. 7 is a simplified timeline illustration of control word delivery and polarity within the system of FIG. 1.

Reference is now made to FIGS. 5-7. FIG. 5 is a simplified timeline illustration of control word polarity within the system of FIG. 1. FIG. 6 is a simplified block diagram illustration of a preferred implementation of a descrambler in the PVR of FIG. 1. FIG. 7 is a simplified timeline illustration of control word delivery and polarity within the system of FIG. 1.

In some PVR systems, control words are preferably produced slightly before they are needed, so that a control word will be available the instant a packet encrypted to that control word is sent to the descrambler. Thus, the descrambler must hold two control words in memory, the current control word, and the next control word (FIG. 6). To distinguish between the control words, one control word is referred to as an "odd" control word, and the next control word is referred to as an "even" control word. As depicted in FIG. 5, control words alternate between even and odd polarity. FIG. 7 depicts control words being delivered (dotted lines) slightly before the key period in which they are required (solid lines). Those skilled in the art will appreciate that packets which include the video stream are correspondingly denoted as odd packets and even packets. Odd packets may only be decrypted using control words of odd polarity, and even packets may only be decrypted using control words of even polarity.

In PVR systems where it is hard or impossible to stream video with different decryption keys that have the same polarity (odd-odd or even-even), the calculation of vicinity considers two cases:

a. If the new position has the same control word polarity as the previous frames that were streamed, the vicinity is considered to be the key period before the new position's key period and the key period after the new position's key period (key_period_+1 and key_period_−1, FIG. 4).

b. If the new position has the opposite control word polarity as the previous frames that were streamed, the vicinity is preferably considered to be:
the candidate key period (key_period_0, FIG. 4);
the key period two key periods prior to the candidate key period (key_period_−2, in FIG. 4); and
the key period two key periods after the candidate key period (key_period_+2, in FIG. 4).

Thus, only odd-even and even-odd key transitions are made, and not odd-odd and even-even key transitions. It is appreciated that for exceptionally long key periods, the key period two key periods prior to the candidate key period (key_period_−2, in FIG. 4) and the key period two key periods after the candidate key period (key_period_+2, in FIG. 4) may not be considered.

The inventors of the present invention believe that using the above techniques preferably reduces the number of decryption keys which are required for high speed trick modes from the number of decryption keys which are required by prior art systems. Furthermore, the present invention is believed, under some conditions, to greatly reduce bandwidth required to render high speed trick modes, as prior art systems are based solely on selecting and rendering key-frames.

In light of the above discussion, those skilled in the art will appreciate that the sections preparation unit 50 depicted in FIG. 1 may preferably include a plurality of sections preparation units 50, each of which prepares the key for a future section. In some preferred embodiments of the present invention, the number of active sections preparation units 50 preferably changes dynamically, according to the availability of processing time in a key generating unit, such as a smart card.

Figure 8:
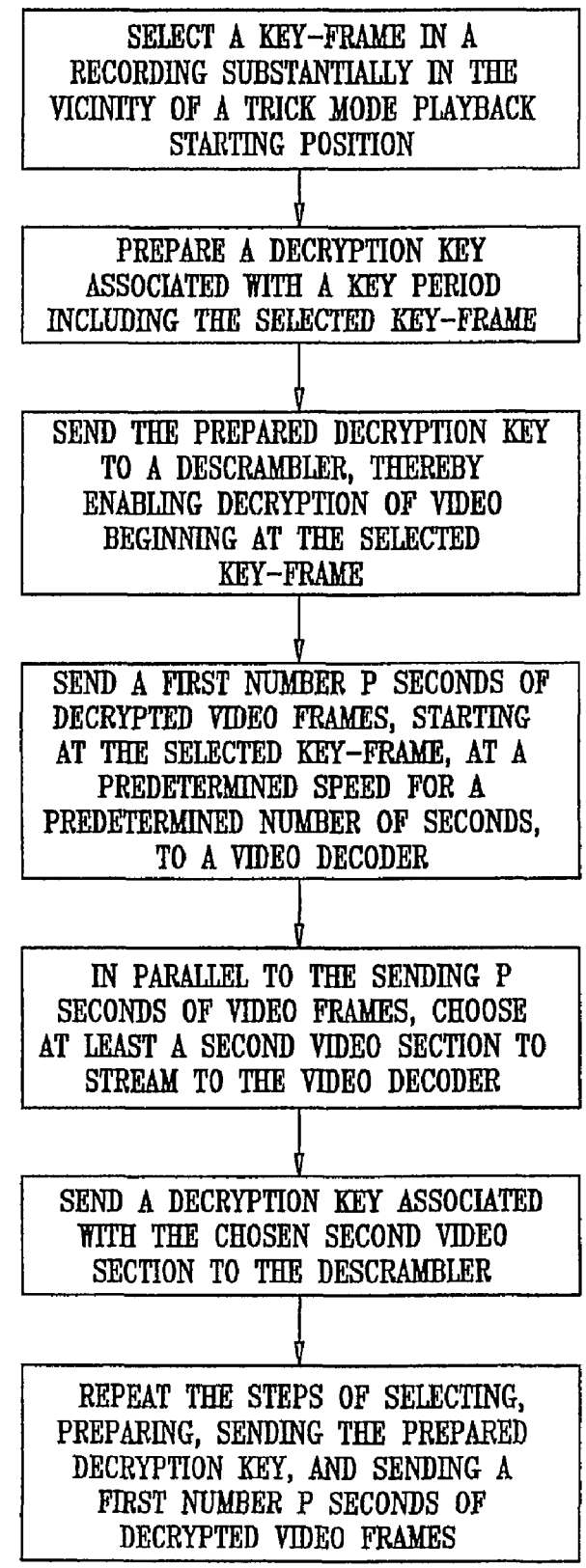
FIG. 8 is a simplified flowchart of a preferred method of operation of the system of FIG. 1.

Reference is now made to FIG. 8, which is a simplified flowchart of a preferred method of operation of the system of FIG. 1. FIG. 8 is believed to be self explanatory in light of the above discussion.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined only by the claims which follow:

What is claimed is:

1. A method for trick mode playback, the method including:
   selecting a key-frame in a recording substantially in the vicinity of a trick mode playback starting position;
   preparing a first decryption key associated with a key period including the selected key-frame;
   sending the prepared first decryption key to a descrambler, thereby enabling decryption of video beginning at the selected key-frame;
   sending a first number P seconds of decrypted video frames, starting at the selected key-frame, at a predetermined speed for a predetermined number of seconds, to a video decoder;

in parallel to the sending the P seconds of video frames, choosing at least a second video section to stream to the video decoder;

sending a second decryption key associated with the chosen second video section to the descrambler; and repeating the steps of:
- selecting;
- preparing;
- sending the prepared first decryption key; and
- sending a first number P seconds of decrypted video frames.

2. The method according to claim 1 and wherein the choosing includes defining a new starting position based, at least in part, on the following: the previous starting position; P; and a second number J seconds of video to be skipped.

3. The method according to claim 1 and wherein the recording is encrypted in accordance with a data stream encryption scheme not using ECM and key polarity, and the vicinity includes three consecutive key periods, the middle of the three consecutive key periods including a candidate key period.

4. The method according to claim 2 and wherein the recording is encrypted in accordance with a data stream encryption scheme not using ECM and key polarity, and the vicinity includes three consecutive key periods, the middle of the three consecutive key periods including a candidate key period.

5. The method according to claim 1 and wherein the recording is encrypted in accordance with a data stream encryption scheme using ECM and key polarity, and the vicinity includes one of:
- if a candidate key period has the same key polarity as previous frames which were streamed, the vicinity includes:
  - a key period immediately before the candidate's position; and
  - a key period immediately after the candidate's position; and
- if the candidate key period has the opposite key polarity as previous frames which were streamed, the vicinity includes:
  - the candidate position's key period;
  - a key period two key periods prior to the candidate key period; and
  - a key period two key periods after the candidate key period.

6. The method according to claim 2 and wherein the recording is encrypted in accordance with a data stream encryption scheme using ECM and key polarity, and the vicinity includes one of:
- if a candidate key period has the same key polarity as previous frames which were streamed, the vicinity includes:
  - a key period immediately before the candidate's position; and
  - a key period immediately after the candidate's position; and
- if the candidate key period has the opposite key polarity as previous frames which were streamed, the vicinity includes:
  - the candidate position's key period;
  - a key period two key periods prior to the candidate key period; and
  - a key period two key periods after the candidate key period.

7. A trick mode playback apparatus, the apparatus including:
- a key-frame selector, which selects a key-frame in a recording, the key frame being substantially in the vicinity of a trick mode playback starting position;
- a decryption key preparer, operative to prepare a first decryption key associated with a key period including the selected key-frame;
- a transmitter which transmits the prepared first decryption key to a descrambler, thereby enabling decryption of video beginning at the selected key-frame;
- a video decryptor which sends a first number P seconds of decrypted video frames, starting at the selected key-frame, at a predetermined speed for a predetermined number of seconds, to a video decoder;
- a video selector which, in parallel to the video decryptor sending the P seconds of video frames, chooses at least a second video section to stream to the video decoder; and
- a decryption key transmitter which sends a second decryption key associated with the chosen second video section to the descrambler;

wherein the trick mode playback apparatus is operative to iteratively repeat the:
- selecting the key frame;
- preparing the first decryption key;
- transmitting the prepared first decryption key; and
- sending a first number P seconds of decrypted video frames.

8. The apparatus according to claim 7 and wherein the video selector chooses a new starting position based, at least in part, on the following: the previous starting position; P; and a second number J seconds of video to be skipped.

9. The apparatus according to claim 7 and wherein the recording is encrypted in accordance with a data stream encryption scheme not using ECM and key polarity, and the vicinity includes three consecutive key periods, the middle of the three consecutive key periods including a candidate key period.

10. The apparatus according to claim 8 and wherein the recording is encrypted in accordance with a data stream encryption scheme not using ECM and key polarity, and the vicinity includes three consecutive key periods, the middle of the three consecutive key periods including a candidate key period.

11. The apparatus according to claim 7 and wherein the recording is encrypted in accordance with a data stream encryption scheme using ECM and key polarity, and the vicinity includes one of:
- if a candidate key period has the same key polarity as previous frames which were streamed, the vicinity includes:
  - a key period immediately before the candidate's position; and
  - a key period immediately after the candidate's position; and
- if the candidate key period has the opposite key polarity as previous frames which were streamed, the vicinity includes:
  - the candidate position's key period;
  - a key period two key periods prior to the candidate key period; and
  - a key period two key periods after the candidate key period.

12. The apparatus according to claim 8 and wherein the recording is encrypted in accordance with a data stream encryption scheme using ECM and key polarity, and the vicinity includes one of:

if a candidate key period has the same key polarity as previous frames which were streamed, the vicinity includes:

a key period immediately before the candidate's position; and a key period immediately after the candidate's position; and if the candidate key period has the opposite key polarity as previous frames which were streamed, the vicinity includes:

the candidate position's key period;

a key period two key periods prior to the candidate key period; and a key period two key periods after the candidate key period.

13. Trick mode playback apparatus comprising:

means for selecting a key-frame in a recording, the key frame being substantially in the vicinity of a trick mode playback starting position;

means for preparing a first decryption key associated with a key period including the selected key-frame;

means for transmitting the prepared first decryption key to a descrambler, thereby enabling decryption of video beginning at the selected key-frame;

means for decrypting video, the means for decrypting video sending a first number P seconds of decrypted video frames, starting at the selected key-frame, at a predetermined speed for a predetermined number of seconds, to a video decoder;

means for selecting video, the means for selecting video selecting at least a second video section to stream to the video decoder, in parallel to the means for decrypting video sending the P seconds of video frames; and means for transmitting a second decryption key to the descrambling means, the second decryption key being associated with the chosen second video section;

wherein the trick mode playback apparatus is operative to iteratively repeat the:

selecting the key frame;

preparing the first decryption key;

transmitting the prepared first decryption key; and sending a first number P seconds of decrypted video frames.

\* \* \* \* \*